United States Patent

[11] 3,547,282

[72] Inventors Ellsworth A. Hartbauer
  Antioch;
  Henry W. Rehr, Concord; Alan R. Goodley, Antioch, Calif.; John W. Wyatt, Auburn, Ala.
[21] Appl. No. 633,137
[22] Filed Apr. 24, 1967
[45] Patented Dec. 15, 1970
[73] Assignee Crown Zellerback Corporation
  San Francisco, Calif.
  a corporation of Nevada

[54] APPARATUS FOR TRANSIENT HANDLING AND STORING OF ARTICLES
17 Claims, 13 Drawing Figs.
[52] U.S. Cl. .................................................. 214/16.4, 214/730
[51] Int. Cl. ...................................................... B65g 1/00
[50] Field of Search .......................................... 214/16B, 16.4, 16.42, 16.14E, 16.12, 302, 730

[56] References Cited
UNITED STATES PATENTS
| 1,605,220 | 11/1926 | Cuviller | 214/16.1(4E) |
| 2,186,854 | 1/1940 | Auger et al. | 214/16.1(4E) |
| 2,565,740 | 8/1951 | Robertson et al. | 214/16.4(2) |
| 3,079,015 | 2/1963 | Sinclair et al. | 214/16.1(4E) |
| 3,240,365 | 3/1966 | King | 214/16.4(2) |
| 3,447,697 | 6/1969 | Morey et al. | 214/8.5 |

FOREIGN PATENTS
| 895,852 | 5/1962 | Great Britain | 214/16.4 |
| 72,243 | 11/1960 | France | 214/16.1(4D) |
| 635,844 | 3/1962 | Italy | 214/302 |
| 180,520 | 5/1966 | U.S.S.R. | 214/16.4(2) |

Primary Examiner—Gerald M. Forlenza
Assistant Examiner—Raymond B. Johnson
Attorneys—William T. Nye, Corwin R. Horton and John O. Reep ABSTRACT: Apparatus for and method of removably storing a plurality of boxlike containers each of which is adapted to receive therein a substantial number of articles such as cartons of facial tissue. The apparatus includes a storage bank adapted to have such boxes or containers inserted through the front face of the storage bank into one of a plurality of openings therein which are arranged in horizontal rows and vertical tiers, each of the boxes when inserted into the storage bank being automatically coupled in tandem orientation to a preceding box previously inserted into the same opening and at the same time being operative to displace such preceding box inwardly toward the rear of the storage bank. The apparatus further includes a box transporter mechanism having moving elements cooperating with elements provided by the box to pick up the boxes individually at a pickup station and then transport each such box to a desired location or opening along the storage bank and insert the box thereinto, the transporter mechanism also being used for subsequently removing boxes from the storage bank and for transporting the boxes to a discharge station. Upon such removal of a box from the storage bank, the box is automatically uncoupled from a preceding box immediately therebehind after the latter box has been advanced to a forward position adjacent the front face of the storage bank. The transporter mechanism includes an elevator cage movable vertically so as to handle boxes at different levels and it further includes a conveyor mechanism arranged with the elevator cage for vertical movement therewith, but also being movable horizontally with respect to the elevator cage for the purpose of picking up, discharging, and inserting boxes into and removing them from the storage bank.

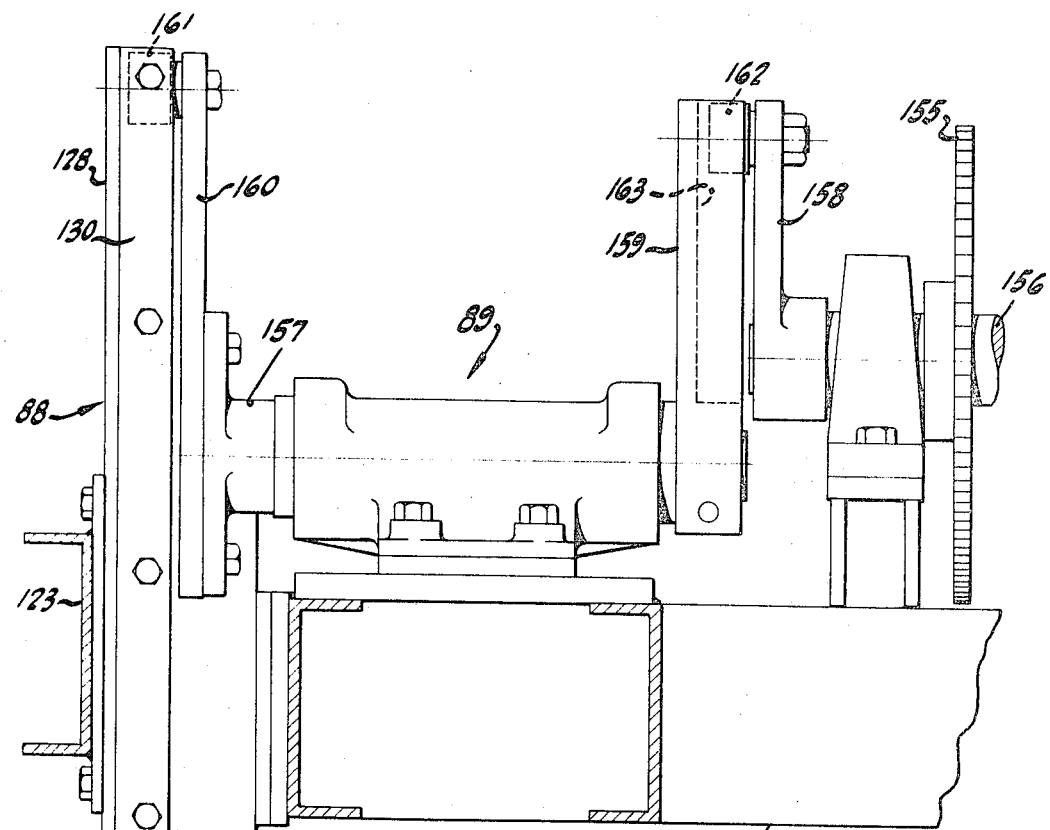
FIG-6
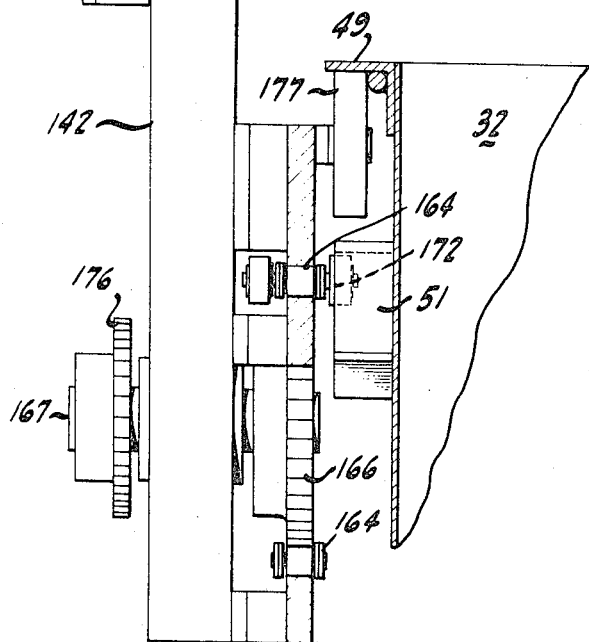
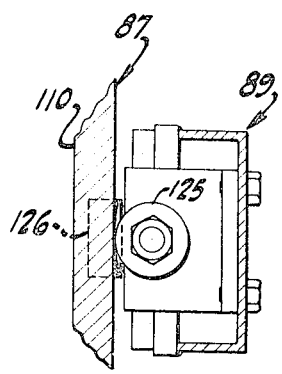
FIG-7

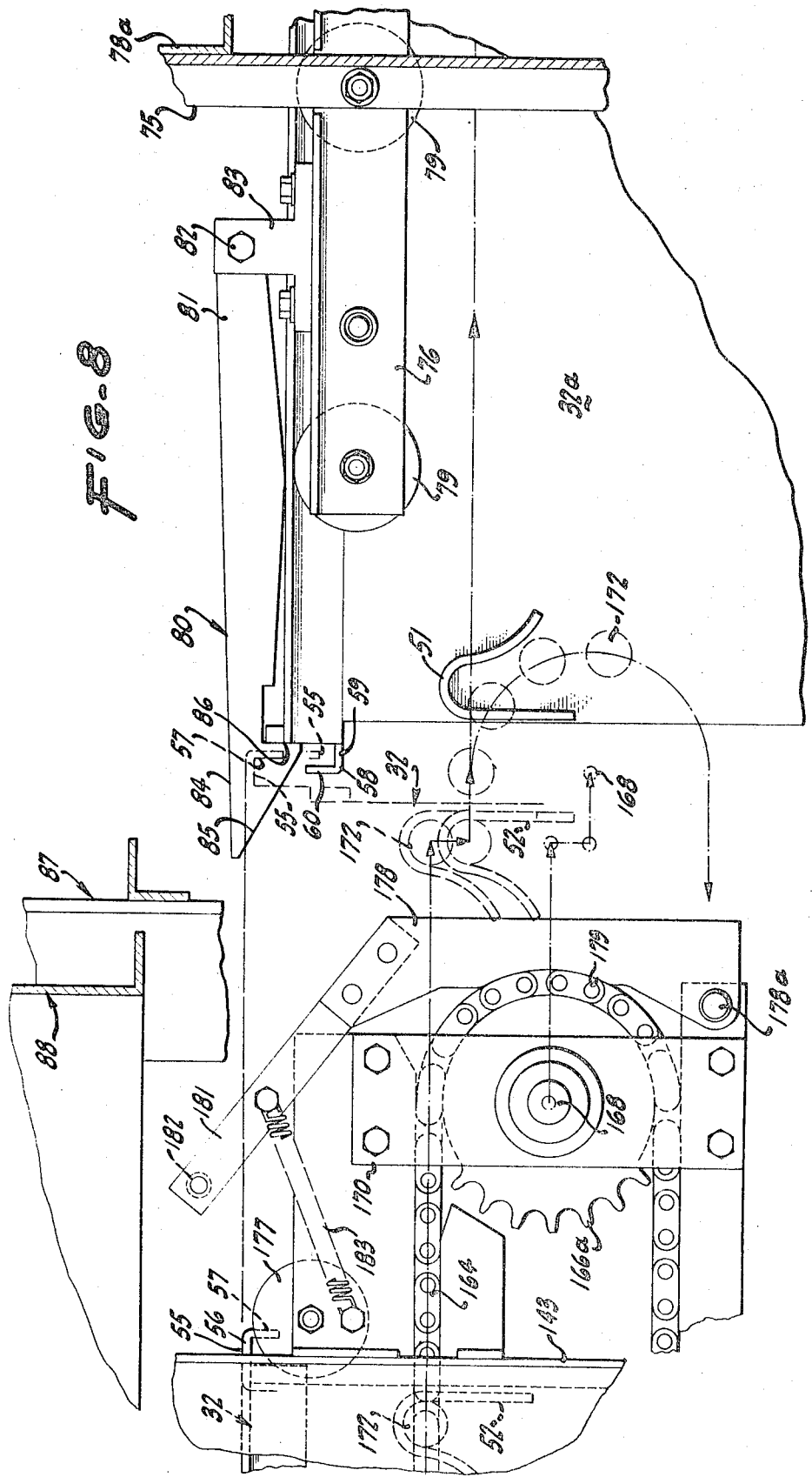

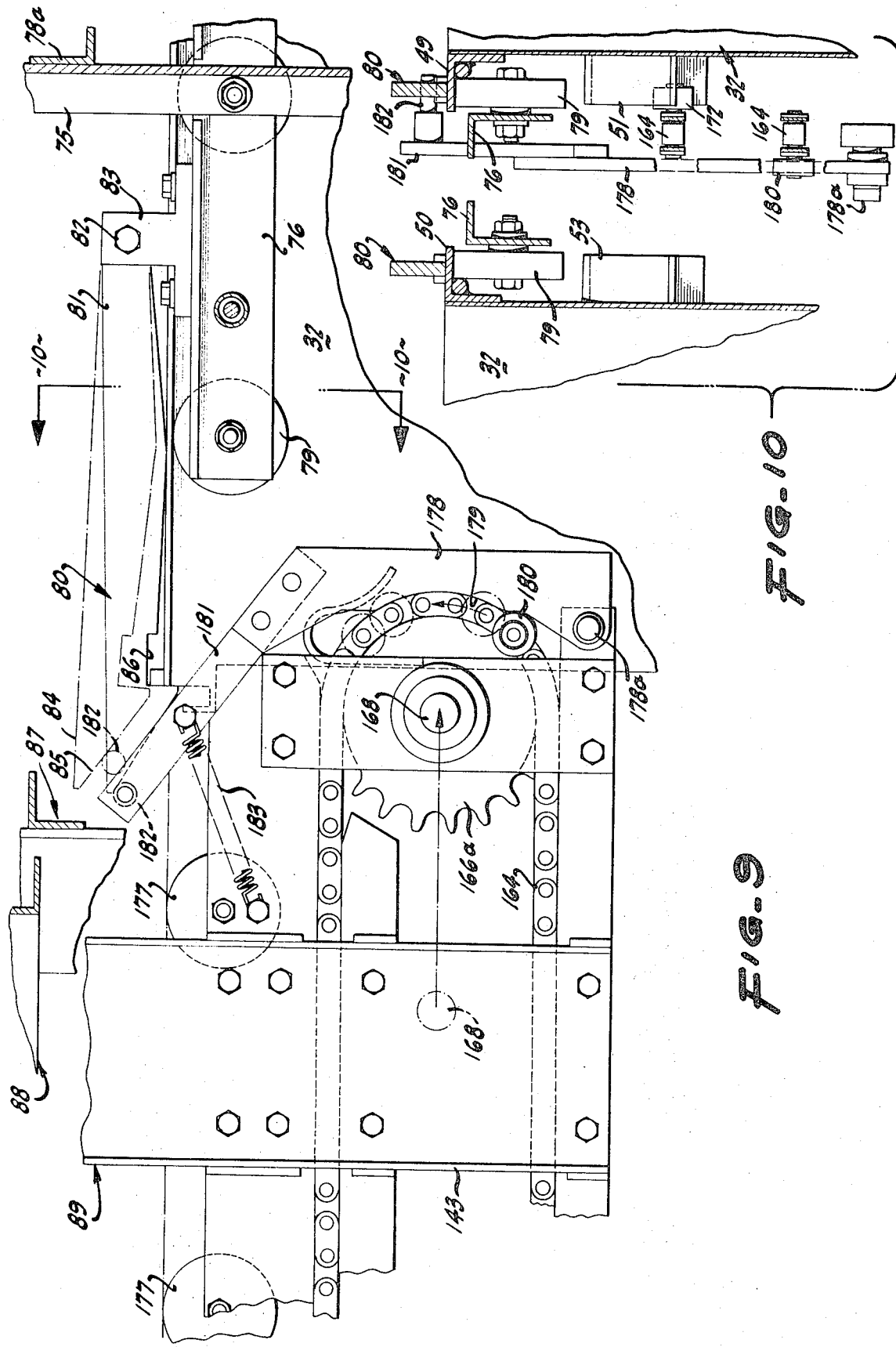

3,547,282

APPARATUS FOR TRANSIENT HANDLING AND STORING OF ARTICLES

BACKGROUND OF THE INVENTION

The present invention relates to a method of and apparatus for transient storage of articles such as cartons of facial tissue; and, more particularly, it relates to temporarily storing such articles in relatively large quantities between processing operations involving the same which, with respect to cartons of facial tissue, may involve the operation of forming the filled cartons and the subsequent operation of packing the cartons in a shipping case therefor. While reference is primarily made hereinafter to the method and apparatus as it relates to transient storage of cartons of facial tissue, it is to be understood that the present invention also has application to the storage of other articles.

For many years cartons of white facial tissue have been packed in shipping cases for distribution to retail outlets. This manufacturing operation, to a large extent, has consisted of forming and packing either single- or double-ply tissue in cartons, and of then advancing such cartons directly from the cartoning machine where they are formed to the case-packing apparatus for packaging in shipping cases. At present, however, tissue is offered to the consumer in several different colors. Many retail outlets, in order to facilitate stocking their display shelves, to reduce inventory problems and to avoid becoming overstocked in any one color, have adopted the practice of ordering cartons of facial tissue in mixed lot cases containing several different colors, the quantities of each color being related to and depending on the purchasing habits of the retailer's customer. For example, a case of tissue may consist of 36 individual cartons, and a typical order might be for 11 cartons of white tissue, 8 cartons of blue, 7 of yellow, 6 of green, and 4 of pink. Manual case packaging by the tissue manufacturer of such mixed lot cases is quite expensive, and in certain instances has resulted in an increase in the cost of manufacture on the order of 25 cents per 36-carton case.

In Rehr et al. U.S. Pat. application Ser. No. 562,204 filed Jul. 1,1966, now U.S. Pat. No. 3,371,767 entitled "Color Selector Mechanism and Method," and assigned to Crown Zellerbach Corporation, the same assignee as of the present application, a method and mechanism are disclosed for automatically selecting a predetermined ratio of cartons of variously colored tissue from a supply of cartons of each color, and for then advancing the selected cartons to a case-packing apparatus for packaging as a mixed-lot case. In connection with the operation of the mechanism disclosed in the patent application just referred to, it is desirable to have a facility for temporarily or transiently storing a relatively large quantity of facial tissue cartons of each color in a storage bank between the time when filled cartons are formed and the time when the filled cartons are supplied to such mechanism for selection thereby of the predetermined ratio of colors for packaging.

One reason for needing this transient storage facility is that machinery used commercially to form the tissue from parent supply rolls and pack the tissue in the cartons practically runs only one color at a time. Further, the parent supply rolls used in such machinery may accommodate a continuous period of production of about 6 to 8 hours, and during that period of time a substantial number of cartons of a single color is produced. Thus, assuming a five-color case-packing operation, the entire run of each of four colors must first be placed in cartons and transiently stored before the fifth color can be produced. Then, while the fifth color is being run, cartons of the first four colors may be removed from storage to enable cartons of all five colors to be presented concurrently to the color-selecting mechanism for selection thereby of the predetermined ratio of colors to be advanced to the case-packing apparatus.

SUMMARY

It is, therefore, a primary object of the present invention to provide a method and apparatus whereby articles, such as cartons of facial tissue, can be conveniently placed in storage for temporary or transient retention, and whereby the articles can be conveniently removed from storage when desired.

In accordance with one aspect of the present invention, a plurality of large boxes or containers are utilized in such storage, each box being adapted to receive therein a substantial number of articles such as facial tissue cartons. A storage bank is provided which receives such boxes one after another in tandem fashion extending from the front face of the storage bank inwardly thereof. The boxes are inserted into and removed from the storage bank by a box transporter mechanism having means for initially picking up the filled boxes at a pickup station and for moving or transporting each such filled box along a path of travel between the pickup station and the storage bank to deposit the boxes therein and, when desired, to remove each of the boxes from the storage bank and transport the removed box to a discharge station. As concerns such storage, the arrangement is such that when a box is removed through the front face of the storage bank, a box immediately behind the box being removed is advanced forwardly to the front face of the storage bank to occupy the position vacated by the box being removed so that each box just prior to its being removed from the storage bank occupies the first or forward position adjacent the front face thereof to facilitate removal of the box by the transporter mechanism.

Another aspect of the present invention resides in the manner of and mechanism for picking up each box at the pickup station and for thereafter depositing the box in the storage bank and subsequently for removing the box therefrom so that each box when placed in the storage bank will be coupled in tandem orientation to another box previously placed in storage at the same location, and so that when each box is removed from storage it will be uncoupled from the box immediately therebehind after the latter box has been advanced to the forward position adjacent the front face of the storage bank.

Other aspects of the present invention reside in the cooperative relationship between a latch member carried by and forming a part of the storage bank and a latch release member carried by and forming a part of the box transporter mechanism, the latch member being operative to hold or limit a box at the front face of the storage bank against outward movement therefrom but being released automatically by such latch release member upon movement of the transporter mechanism is removing the forward box from storage and, after removal of such box, the latch member automatically becomes effective to hold the next successive box in place until subsequent removal of that box.

BRIEF DESCRIPTION OF THE DRAWING

An embodiment of the present invention is illustrated in the accompanying drawings, in which:

FIG. 6 is an enlarged broken sectional view taken along line 6–6 of FIG. 4;

FIG. 7 is an enlarged broken sectional view taken along the line 7–7 of FIG. 4;

FIG. 8 is an enlarged detailed broken away side view illustrating movement of a box into the storage bank;

FIG. 9 is an enlarged broken away side view similar to FIG. 8, but illustrating movement of a box out of the storage bank;

FIG. 10 is a broken away sectional view taken along the line 10–10 of FIG. 9;

FIG. 13 is a somewhat diagrammatic side elevational view illustrating the interconnection of boxes in the storage bank frame.

GENERAL DESCRIPTION

Figure 1:
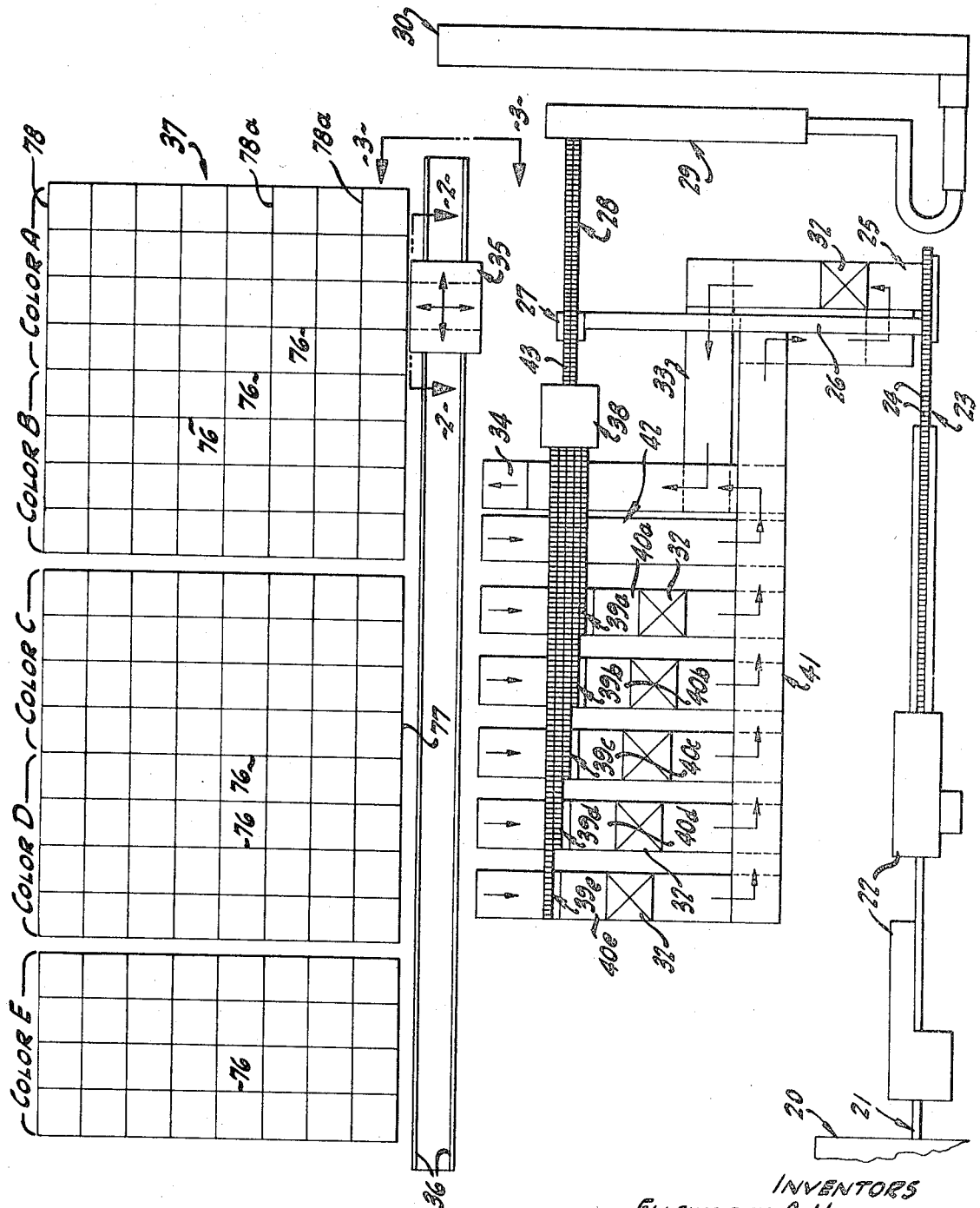
FIG. 1 is a block diagram illustrating an entire facial tissue production system embodying the invention.

An entire box facial tissue fabrication line is illustrated in FIG. 1, and referring thereto it will be noted that such line includes a back stand generally denoted with the numeral 20. The back stand 20 constitutes a plurality of individual parent rolls (not shown) of tissue totaling, in the usual instance, 102 separate rolls each providing a web which is slit longitudinally as it is withdrawn from the roll into two individual webs each of facial tissue width (usually about 8½ inches wide). The paper webs are withdrawn concurrently from the parent rolls, and as such individual webs are advanced, they are folded into the desired size and are stacked one upon another to form a longitudinally extending "log" 21 comprising 204 individual webs oriented in vertical juxtaposition.

The log 21 is advanced into a saw and cartoning machine 22 which severs the log transversely at spaced-apart locations therealong to section the same into facial tissue lengths, and then places each such section into a carton therefor which is thereafter closed and advanced along a conveyor 23. Accordingly, the conveyor 23 has disposed therealong a succession of individual cartons oriented in side-by-side juxtaposition, which cartons are denoted with the numeral 24.

As concerns the present invention, the back stand 20, cartoning machine 22 and each of the cartons of tissue may be completely conventional and, as is well known, each such carton, as a typical example, will contain 200 double-ply tissues folded into a C-shaped or Z-shaped configuration.

Adjacent the end of the conveyor is a box filler 25 and also a bypass conveyor section 26 which terminates at a diverter 27. Associated with the diverter 27 is a discharge conveyor 28 which empties into a case packer 29 operative to place a group of cartons 24 (usually totaling 36) into a shipping case. After the shipping case has been packed it can be placed upon a pallet in a palletizer 30. The case packer 29 and palletizer 30 may be conventional pieces of equipment as respects the present invention.

Whether the cartons 24 are advanced through the bypass section 26 or are advanced into the box filler 25 is a matter of manual selection made by an operator controlling the entire fabrication line by means of a control console (not shown). When the selection is such that the cartons 24 are advanced into the box filler 25, the cartons are collected into individual layers comprising a plurality of transversely extending and longitudinally extending rows, and the cartons are then displaced layer-by-layer into a storage box or container 32 which, in the specific structure being considered, is sufficiently large to receive therein 972 individual cartons. After the box 32 has been loaded with cartons, it is advanced along a conveyor structure 33 to a pickup station 34 where it is grasped by a box transporter mechanism 35 selectively movable along an elongated track 36.

Disposed along the track 36 is a storage bank frame 37 adapted to accommodate, in the apparatus shown, cartons containing tissue of five separate colors. For this purpose, the storage bank 37 is divided into five sections of equal capacity, which equality of capacity is not essential, respectively denoted by brackets and designated by the legends color A through color E. The structure of the storage bank frame will be set forth hereinafter in greater detail.

Ultimately the storage bank 37 will contain a relatively large number of cartons of variously colored tissue, and, as mentioned previously, a large capacity for the storage bank is required because a period of several hours of operation follows each loading of the back stand 20 with parent rolls of any one color. By way of indicating the size of the storage bank 37, it may have a capacity of 640 boxes 32 containing 622,080 cartons of facial tissue so that each such color section will have a capacity of 128 boxes.

The number of cartons of each color of tissue which will be packed in any one case is predetermined, and cartons in appropriate number and color in accordance with such determinations are automatically delivered to the aforementioned discharge conveyor 28 by a color selector mechanism 38. The color selector mechanism forms the subject of the aforementioned Pat. application Ser. No. 562,204. The delivery of cartons to the selector 38 is effected by a plurality of infeed conveyors 39a—39e, respectively adapted to receive cartons containing the various tissue colors. The infeed conveyors 39a—39e receive cartons from a group of box unloaders 40a—40e respectively associated with the infeed conveyors 39a—39e. Loaded boxes 32 are delivered to the unloaders 40 by the box transporter mechanism 35 which withdraws such boxes from the storage bank 37 on command from the control console.

After a box 32 has been emptied by an unloader 40, the empty box is advanced along a return conveyor 41 to the box filler 25 where it is available for a subsequent loading cycle. In the case where a sufficient supply of empty boxes 32 is available for use at the box loader 25, additional empty boxes may be diverted onto the conveyor structure 33 for return to the pickup station 34 from which it is deposited by the box transporter mechanism 35 into the storage bank 37. Should a need arise at the box filler 25 for additional empty boxes, they may be withdrawn from the storage bank 37 and delivered to the return conveyor 41 via a conveyor section 42.

A continuous supply of cartons of a variously colored tissue is delivered by the infeed conveyors 39 to the selector 38, and the selector is operative to select and segregate or separate from such supply the requisite number of cartons of each tissue color and to arrange the separated cartons into two rows along a combining or assembly table 43 from which the cartons are advanced onto the discharge conveyor 28. As explained heretofore, the conveyor 28 advances such two rows of cartons into the case packer 29 which functions in a conventional manner to pack such cartons into a shipping case. Evidently, the diverter 27 must be conditioned selectively to receive cartons from the combining table 43 or from the bypass section 26, since it is necessary that each of these two components delivers cartons to the discharge conveyor 28 through the diverter 27.

Summarizing the operation of the box facial tissue fabrication line illustrated in FIG. 1, tissue webs are withdrawn from the parent rolls thereof provided at the back stand 20, and thereafter such webs were slit, folded and stacked one upon another to define an elongated log which is severed transversely into sections of carton length, each of which sections is then packaged into a carton therefor. The filled cartons are advanced in side-by-side succession toward the box filler 25 which is operative to place a predetermined number of cartons in each storage box 32. The loaded boxes are advanced one-by-one to the pickup station 34 from which they are deposited by the box transporter mechanism 35 into the storage bank 37 in the color section thereof corresponding to the color of the tissue.

When cartons having all of the necessary tissue colors are available in the storage bank, 37, the box transporter mechanism 35 withdraws boxes from the storage bank and deposits each box at the appropriate box unloader 40 which is operative to unload the box and deposit the cartons therefrom on the associated infeed conveyor 39. Thereafter, the empty boxes 32 are returned to the box filler 25 (or to the storage bank 37, as explained) and the cartons of tissue are fed into the color selector 38 which selects and segregates the requisite number of cartons of each tissue color and combines the segregated cartons of each tissue color and combines the segregated cartons into two parallel rows, which rows are then advanced by the discharge conveyor 28 into the case packer 29. Should it be desired to bypass the box filler 25, storage bank 37, box unloaders 40 and selector 38, the cartons 24 leaving the cartoning machine 22 are directed into the bypass section 26 which delivers such cartons directly to the discharge conveyor 28 through the diverter 27; and in this event, each case will contain cartons of one tissue color only.

The present invention is concerned primarily with a portion of the apparatus or system, including particularly the boxes 32, the storage bank 37, and the box transporter mechanism 35. The following description will elaborate in greater detail these parts or components of the apparatus, the interrelationship between them and a mode of operation whereby transient storage of the cartons 24 is effectively accomplished.

BOXES FOR RECEIVING CARTONS OF TISSUE AND PICKUP STATION

Figure 2:
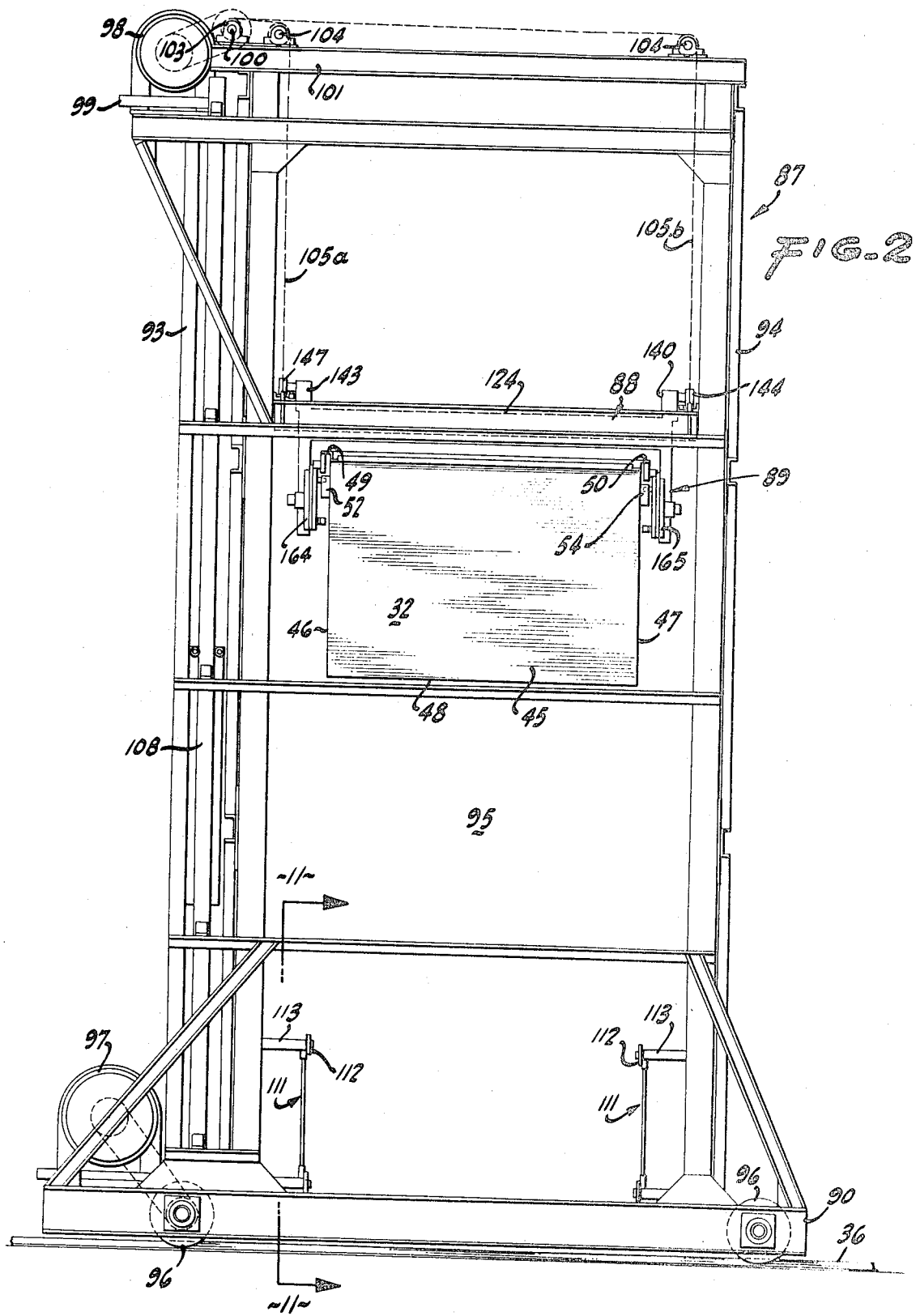
FIG. 2 is a rear elevational view of the box transporter mechanism with a box supported therein the view being taken along line 2–2 of FIG. 1.

Each of the boxes 32 in generally rectangular in transverse cross section and includes a front wall 44 (FIG. 3) and, as shown in FIG. 2, a rear wall 45, opposed or facing sidewalls 46 and 47 and a bottom wall 48. Integral flanges 49 and 50 are coextensive, respectively, with the top edges of the sidewalls 46 and 47 and extend outwardly therefrom to permit the box to be supported upon rollers engaged by the flanges both in the transporter mechanism 35 and in the storage bank 37. Each box 32 further includes four inverted generally U-shaped receivers 51—54 (FIGS. 5 and 8) for permitting the box to be picked up by a conveyor component of the box transporter mechanism 35 in a manner to be described hereinafter in greater detail. As is perhaps clearest in FIG. 5, two of the receivers are located on the outer surface of each of the sidewalls 46 and 47 immediately adjacent the front and rear walls 44 and 45 and are spaced slightly downwardly from the top edge of the box below the respectively associated flanges 49 and 50.

The rear wall 45 of each box 32 includes a coupling member 55 (FIGS. 5 and 8) in the form of an outwardly directed flange portion 56 coextensive with the top edge of the rear wall and which terminates in a downwardly directed leg portion 57 defining with rear wall an inverted U-shaped channel. The front wall 44 of each box 32 also includes a coupling member 58 in the form of an outwardly directed flange portion 59 spaced slightly downwardly from the top edge of the front wall and which terminates in an upwardly directed leg portion 60 defining with the front wall a U-shaped channel. These coupling members 55 and 58 permit the rear wall of one box to be coupled to the front wall of an adjacent box as indicated in FIG. 8, when the boxes are received in the storage bank 37 in a manner to be pointed out later in greater detail.

Figure 12:
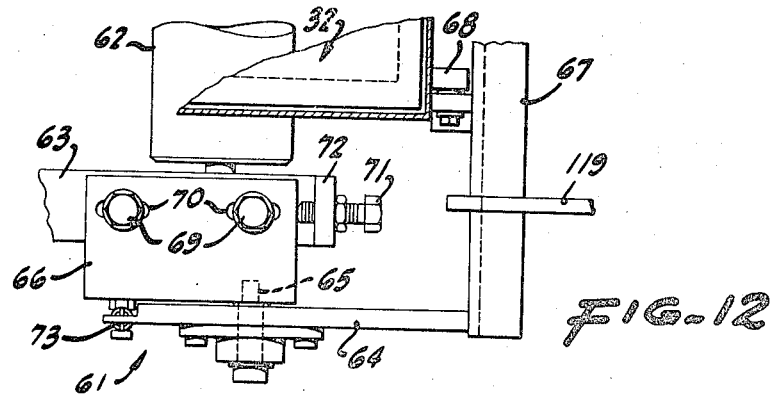
FIG. 12 is an enlarged broken away sectional view taken along the line 12-12 of FIG. 11.
Figure 11:
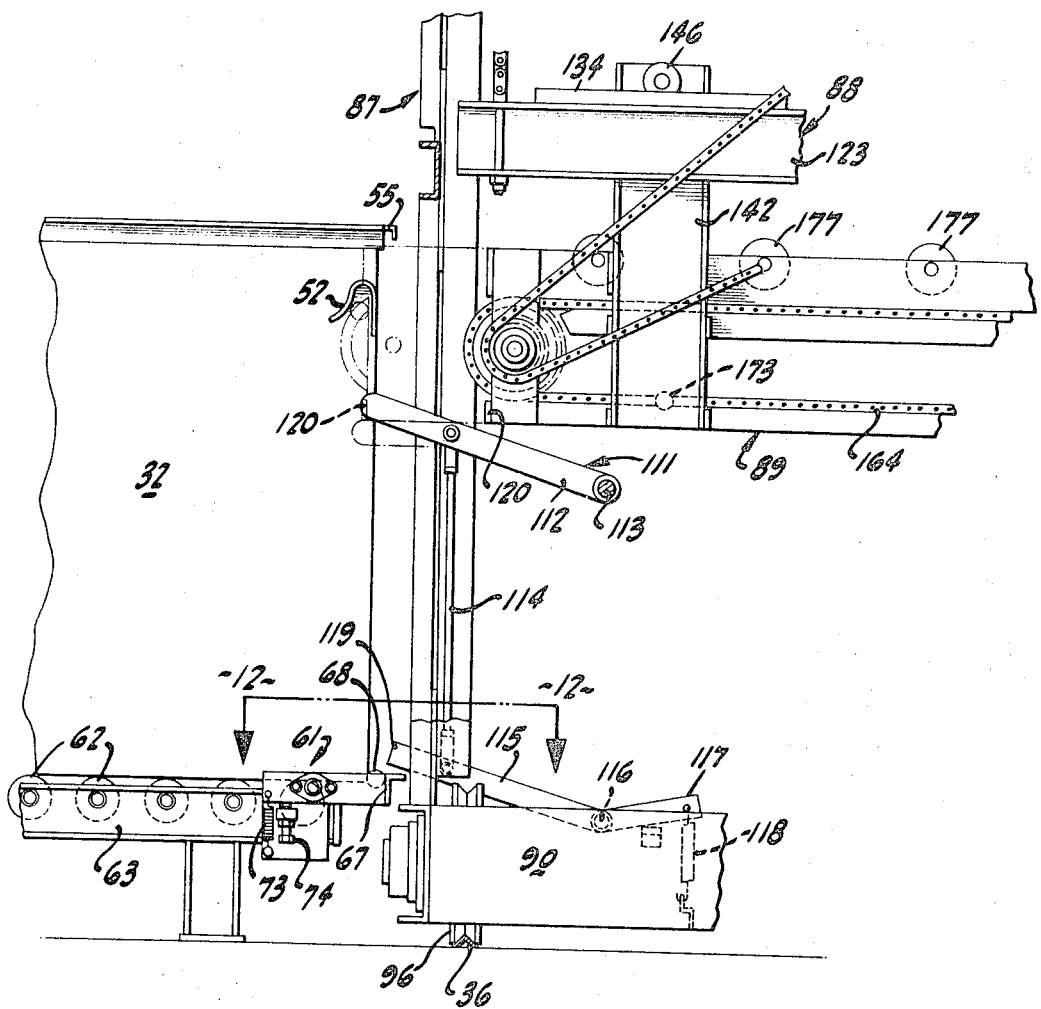
FIG. 11 is an enlarged broken away side elevational view taken along the line 11-11 of FIG. 2.

One of the boxes 32 in position at the pickup station 34 is illustrated at FIGS. 11 and 12, which FIGS. also illustrate a releasable stop mechanism 61 located at the pickup station to positively stop the box at an outermost point of travel to which it is carried by conveyor rollers 62 mounted on a frame 63. The stop mechanism 61 includes a plate 64 which has a pivotal connection 65 to a bracket 66, and which plate carries an abutment or bar portion 67 extending in one position of the plate in front of the lower outer edge of the box 32. A roller 68 is mounted on this bar 67 so as to engage the box in such one position of the plate. The bracket 66 is fixedly secured to the frame 63 through the medium of bolts 69, although slight adjustment of the position of the bracket in the direction of movement of the box may be accomplished by loosening the bolts and moving the bracket with respect to the bolts with the bolts riding in grooves 70 provided for such adjustment purposes. In this same reference, a threaded bolt 71 extending through a flange 72 at the end of the frame 63 precludes inadvertent outward sliding of the bracket 66 and adjustably establishes the outermost position thereof. A spring 73 has one end attached to the bracket 66 and the other end attached to the plate 64 on the side of the pivot point opposite the bar 67, and therefore urges the bar 67 toward an upper or box-stopping position (counterclockwise as viewed in FIG. 11). A bolt 74 threadedly mounted in the bracket 66 and engageable with the undersurface of the plate 64 may be used to adjust the uppermost position of the bar 67. It is to be understood that the box 32 will be free to move outwardly only after the bar 67 has been pivoted downwardly against the bias of the spring 73 to clear the bottom edge of the box.

STORAGE BANK

Figure 3:
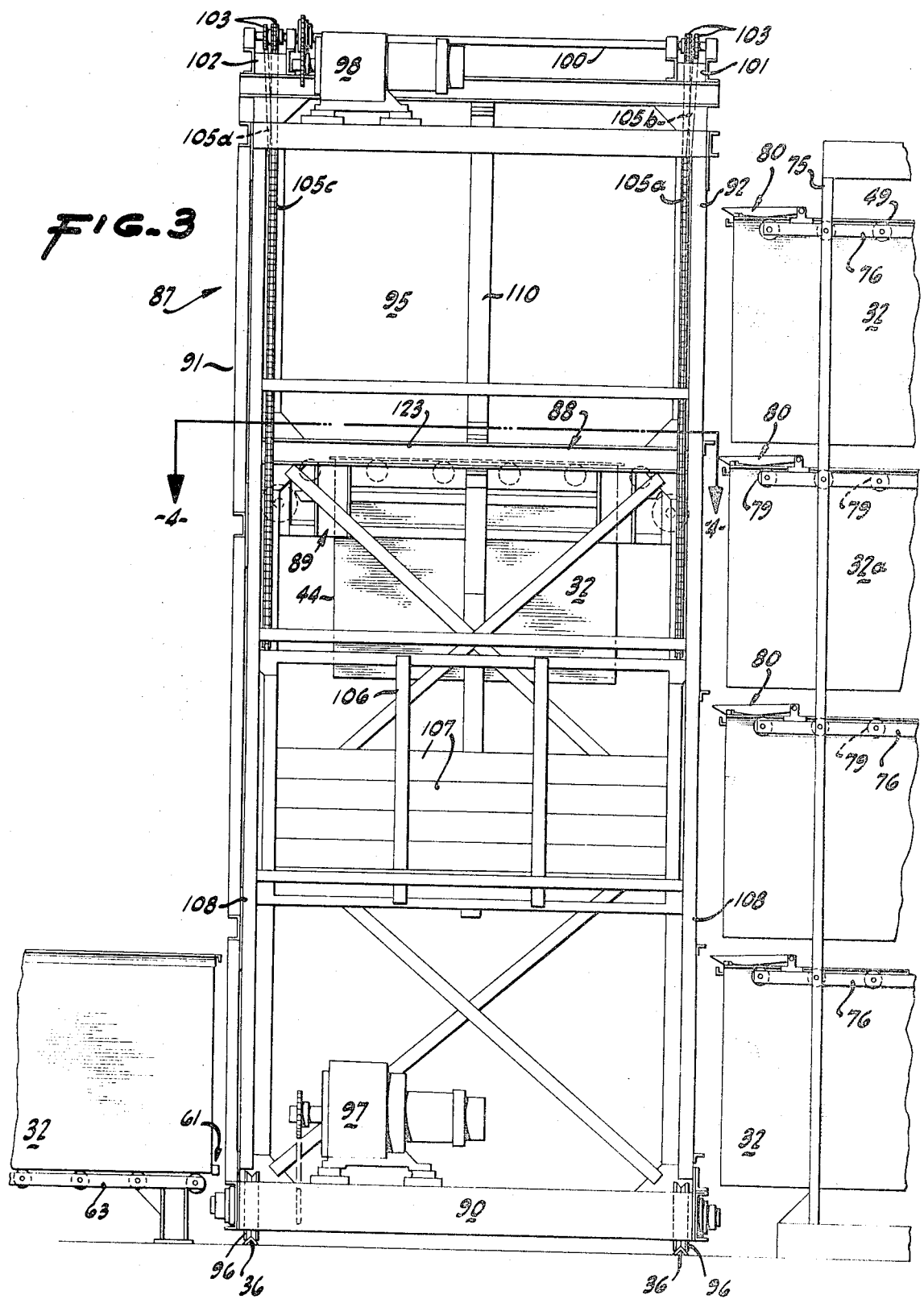
FIG. 3 is a side elevational view taken along line 3–3 of FIG. 1.

The storage bank 37 includes a plurality of vertically extending frame members 75 (FIGS. 3 and 8) suitably supported upon the floor, and in adequate quantity to carry the entire weight of the largest number of filled boxes 32 intended to be temporarily stored in the storage bank. Suitably secured to the vertical frame members 75 are a plurality of horizontal frame members 76 (referred to hereinafter for convenience of description as channel members, but being shown in the drawings as structural angles) extending between the front face 77 and the rear face 78 of the storage bank, as shown in FIG. 1. As is clear from FIG. 3, the channel members 76 are spaced from each other vertically a distance slightly greater than the vertical height of each box 32 and define therebetween the aforementioned vertically disposed tiers of openings, there being four such tiers in the particular storage bank being considered as shown in FIG. 3. The channel members 76 are also spaced from each other horizontally by a distance slightly greater than the distance between opposed sidewalls 46 and 47 of the boxes 32 to define the aforementioned horizontally disposed openings. The storage bank is provided transversely with a plurality of frame elements in the form of L-shaped angles 78a (FIGS. 8 and 1) that are horizontally disposed at substantially right angles to the channels 76 and extend between and are connected to the vertical frame members 75.

Spaced rollers 79 (see FIG. 10) are rotatably mounted on each of the channels 76 along the entire lengths thereof, and the rollers are adapted to support boxes 32 when the boxes are inserted in the storage bank. In other words, channels 76 are arranged in horizontally spaced pairs, each channel of any pair thereof being at the same horizontal level and being equipped with rollers 79; and the two channels in any such pair being spaced apart from each other by a greater distance than the distance between the sidewalls 46 and 47 of the box but less than the distance between the extreme outer ends of the flanges 49 and 50 of the box. Evidently, then, each roller-equipped pairs of channels 76 defines a track upon which boxes 32 are movably supported by riding engagement of the flanges 49 and 50 thereof with the rollers 79 of the respectively associated channels. There are sufficient pairs of channels 76 so as to support boxes 32 at the aforementioned horizontally spaced rows of openings in each of several vertical levels or tiers thereof.

A retainer or latch member 80 (see FIGS. 3, 8, 9 and 10) is disposed on the front end of each of the channels 76 and is operative to engage the forward most box supported thereon to constrain the same (and any preceding boxes) within the storage bank until removal of the box is desired, whereupon the latch member is released in a manner to be described later. The latch 80 is pivotally connected adjacent one end 81 thereof by a pivot pin 82 to an appropriate bracket 83 supported by the associated channel 76. The other end 84 of the latch includes a sloping surface 85 terminating in a notch or recess 86 adapted to latchingly engage a box 32 when the latch is pivoted downwardly about the connection 82. The weight of the latch arm is sufficient to gravity bias it in a counterclockwise direction toward the solid line position of FIG. 9 in which the recess 86 on the latch can engage the front edge of a box 32 to hold the box in place. Depending upon the particular environment, the channels 76 may have a very slight downward slope toward the front face 77 of the storage bank, as shown in FIG. 13, which tends to bias the boxes 32 toward such face, thereby assuring that the frontmost box at the front face of the storage bank positively engages the recess or retaining face 86 of the latch which not only constrains such box within the storage bank but also positively establishes the position thereof for retrieval purposes by the transporter mechanism 35. Such downward inclination of the channels 76 is not necessary in the particular apparatus being considered because of the interconnection of the boxes afforded by the coupling members 55 and 58.

BOX TRANSPORTER MECHANISM

The box transporter mechanism 35 includes a tower structure 87 (FIGS. 2 and 3) which is movable along a horizontal path defined by the track 36 (FIG. 1), and which path extends all along the front face of the storage bank 37 and also between the storage bank, pickup station 34, anddischarge station adjacent the various unloaders 40a—'e. An elevator cage 88 is mounted in the tower 87 and therefore travels therewith along the track 36, and such cage is vertically movable within the tower so as to carry boxes between the various elevations established by the pickup station 34, tiers of the storage bank 37, and discharge station. A box loader 89 is carried by the elevator cage 88 for vertical movement therewith, and the loader is also displaceable horizontally with respect to the elevator cage in directions transverse to the horizontal direction of travel of the tower 87 to permit a portion of the box loader to be moved outwardly from either side of the tower for the purpose of picking up boxes 32 at the pickup station and of deposition them at the discharge station, and for unloading boxes in the storage bank and for retrieving boxes therefrom.

TOWER STRUCTURE

Referring especially to FIGS. 2 and 3, it is seen that the tower 87 comprises a plurality of horizontal and vertical frame members interconnected to provide the required strength and rigidity and mounted on a base 90. The frame members define, in skeleton form, a front wall 91, a rear wall 92, and opposed sidewalls 93 and 94, all of which walls together define a central passageway 95 that is vertically disposed and within which the elevator cage moves upwardly and downwardly. The top of the tower 87 extends above the uppermost tier of box-receiving openings or compartments in the storage bank; and the base 90 of the tower is supported upon the track 36 for movement therealong through the medium of four wheels 96 located, respectively, near the four corners of the base for engagement with the rails of such track. A reversible motor 97 for driving one or more of the wheels is mounted on the base 90, and the drive shaft of the motor is appropriately coupled to at least one of the wheels 96 to rotate the same and thereby cause the tower 87 to travel along the track 36 in a direction corresponding to the direction in which the motor is energized.

A reversible motor 98 for raising and lowering the elevator cage 88 is securely mounted on platform structure 99 carried by the frame members at the top of the tower 87. The shaft of the motor 98 is coupled by an endless chain and sprocket structure to a drive shaft 100 which is supported for rotation by appropriate bearings carried by horizontal frame members 101 and 102 located on opposite sides of the tower adjacent the upper end thereof. The drive shaft 100 has four drive sprockets 103 securely pinned thereto and arranged in groups of two adjacent each end of the shaft. Four idler sprockets 104 are located on upper frame members of the tower directly above the respective four corners of the elevator cage 88. Four chains 105a—105d are used to raise and lower the elevator cage 88 in association with the drive sprockets 103 and idler sprockets 104.

Each chain 105 is fastened at one end to a corner of the elevator cage 88 and extends upwardly therefrom and passes over its associated sprocket 104 and thence extends horizontally to and around the associated drive sprocket 103. From the drive sprocket each chain extends downwardly to the top edge of a vertically reciprocable counterweight basket or carrier 106 and is secured thereto. The basket 106 carries a plurality of counterweights 107 and is guided by vertical guide channels 108 for vertical movement along one sidewall of the tower 87 generally below the drive shaft 100. Therefore, when the motor 98 is energized in a direction to drive the elevator cage 88 toward an extreme upper position, the counterweight basket 106 will be driven in enforced synchronism therewith toward an extreme lower position, and vice versa. The counterweights are desirable because the loaded weight of a box 32 carried by the elevator 88 is on the order of 1,400 pounds in one particular embodiment of the invention.

A pair of vertically disposed stationary guide bars 109 and 110 (FIGS. 3, 4 and 5) for guiding the elevator cage 88 respectively extend along the sides 93 and 94 of the tower midway between the front and rear sides 91 and 92 thereof. The exact manner in which the elevator cage cooperates with this bar will be set forth in the description of the elevator cage which is to follow.

A pair of spaced-apart release members 111 (see FIGS. 2 and 11) are mounted on the front end of the tower 87 and are selectively operative to the stop bar 67 which holds any box 32 at an outermost location at the pickup station 34. The release members 111 are substantially the same, and each includes an upper arm 112 which is mounted on the tower for angular displacement about a pivotal axis 113. A push rod 114 is used to connect the upper arm 112 to a lower arm 115, and the normal position of the lower arm locates the front end portion 119 thereof immediately above the stop bar 67 when the tower 87 is moved to a position alongside the pickup station 34. The lower arm 115 is in the nature of a bellcrank and is pivotally mounted intermediate its ends on the tower 87 about an axis established by a pivot pin 116. The lower arm further includes an integral rear portion 117 extending at an angle with respect to the forward portion; and a spring 118 secured to this rear portion 117 and to the tower frame urges the front end 119 of the lower arm 115 upwardly. The position of the upper arm 112 with respect to the horizontally movable box loader 89 is such that when the loader is moved outwardly from the tower 87 toward a box 32 at the pickup station, a front surface 120 of the loader rides over the upper arm 112 to press it downwardly which, through the medium of the rod 114, also pivots the forward portion 119 of the lower arm 115 downwardly. Downward movement of the lower arm 115 brings it into engagement with the box retaining bar 67 and moves this bar downwardly to release the box 32.

ELEVATOR CAGE

As indicated above, the elevator cage 88 is mounted for vertical movement within the tower 87. As is clearest in FIG. 4, the cage 88 includes four channel members 121, 122, 123 and 124 integrally secured together such as by welding. The members 121 and 123 are parallel to each other and lie within and are respectively adjacent the opposite sides 94 and 93 of the tower. The members 122 and 124 are parallel to each other and lie within and are respectively adjacent the front and rear sides 91 and 92 of the tower. A group of three guide rollers 125—127 (see FIGS. 4 and 7) are secured centrally to each of the channels 121 and 123 and extend outwardly thereof, and each such group of three guide rollers engages the associated vertical guide bar 109 or 110 to guide movement of the cage 88 vertically within the tower 87.

Respectively secured to inner surfaces of the channels 121 and 123 are blocks 128 and 129 (FIG. 6), the blocks being directly across from each other and each having a centrally disposed vertically extending groove (130 and 131, respectively) therein. The general purpose of these grooved blocks is to provide reaction surfaces used in effecting horizontal movement of the box loader 89 as will become clear as the description proceeds. Each of the channels 121 and 123 has two spaced trackways (132, 133 and 134, 135, respectively) firmly mounted thereon for the purpose of supporting and guiding horizontal movement of the box loader.

BOX LOADER

As indicated above, the box loader 89 is mounted on the elevator cage 88 for vertical movement therewith, but the box loader is also movable horizontally in a direction transverse to the horizontal path of travel of the tower 87. The loader 89 includes a skeleton platform defined by perimetric frame members 136, 137, 138 and 139 (FIG. 4) extending substantially parallel to, but within and beneath, the perimetric enclosure defined by the aforementioned channels 121—124 of the elevator cage. Two pairs of vertically extending hangers or channels 140, 141 and 142, 143 (FIGS. 4 and 5) are rigidly secured, respectively, to the outer surfaces of the frame members 136 and 138 near the ends thereof, and an outwardly extending roller 144—147 is rotatably secured, through the medium of an appropriate bearing, to each of the hanger channels near the top thereof. The four rollers are in riding engagement with respective trackways 132—135 on the elevator cage, and it is through these rollers, then, that the entire weight of the box loader platform 89 and associated components (and box 32) is carried by the elevator cage 88.

Figure 4:
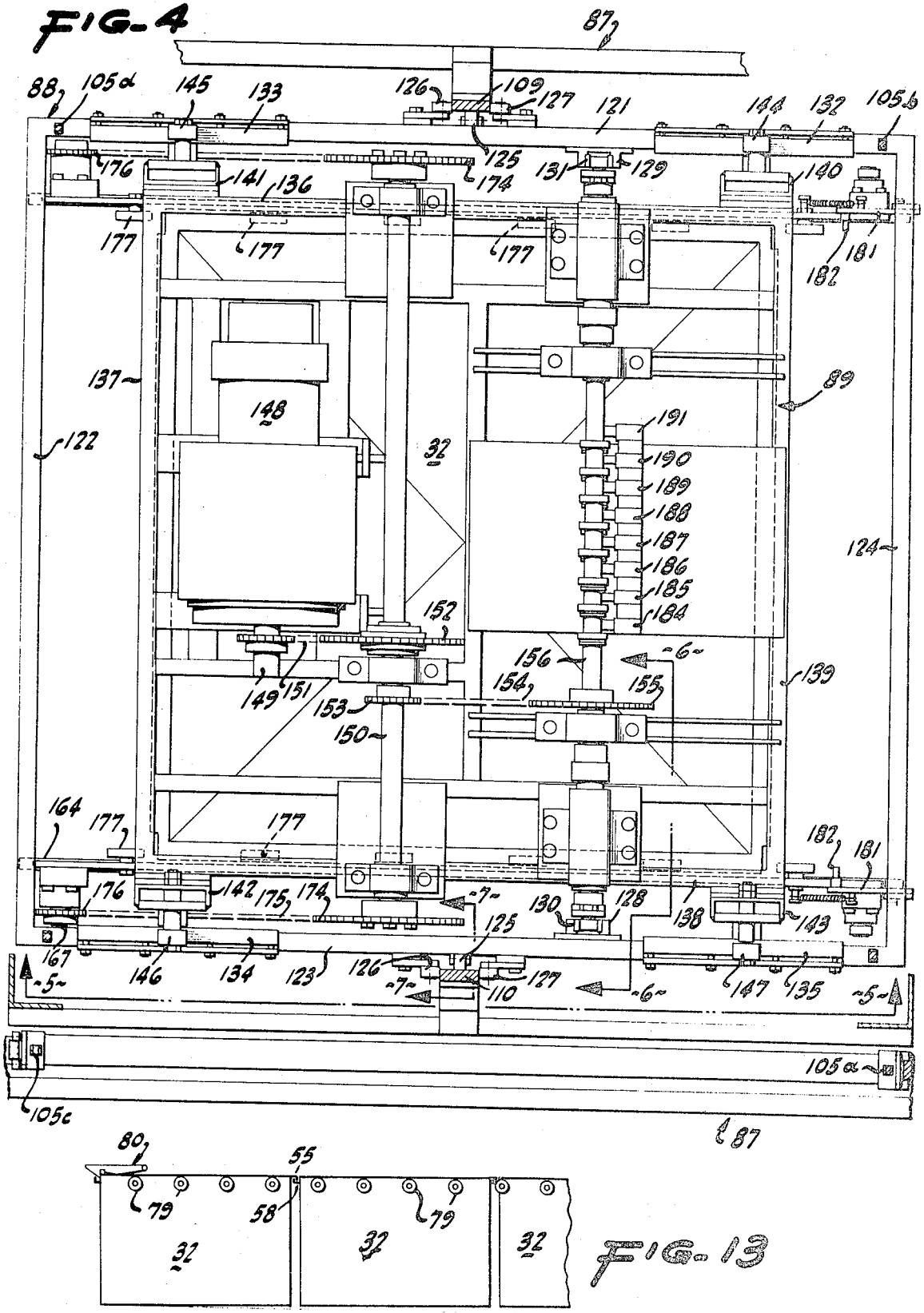
FIG. 4 is an enlarged transverse sectional view taken along line 4–4 of FIG. 3.
Figure 5:
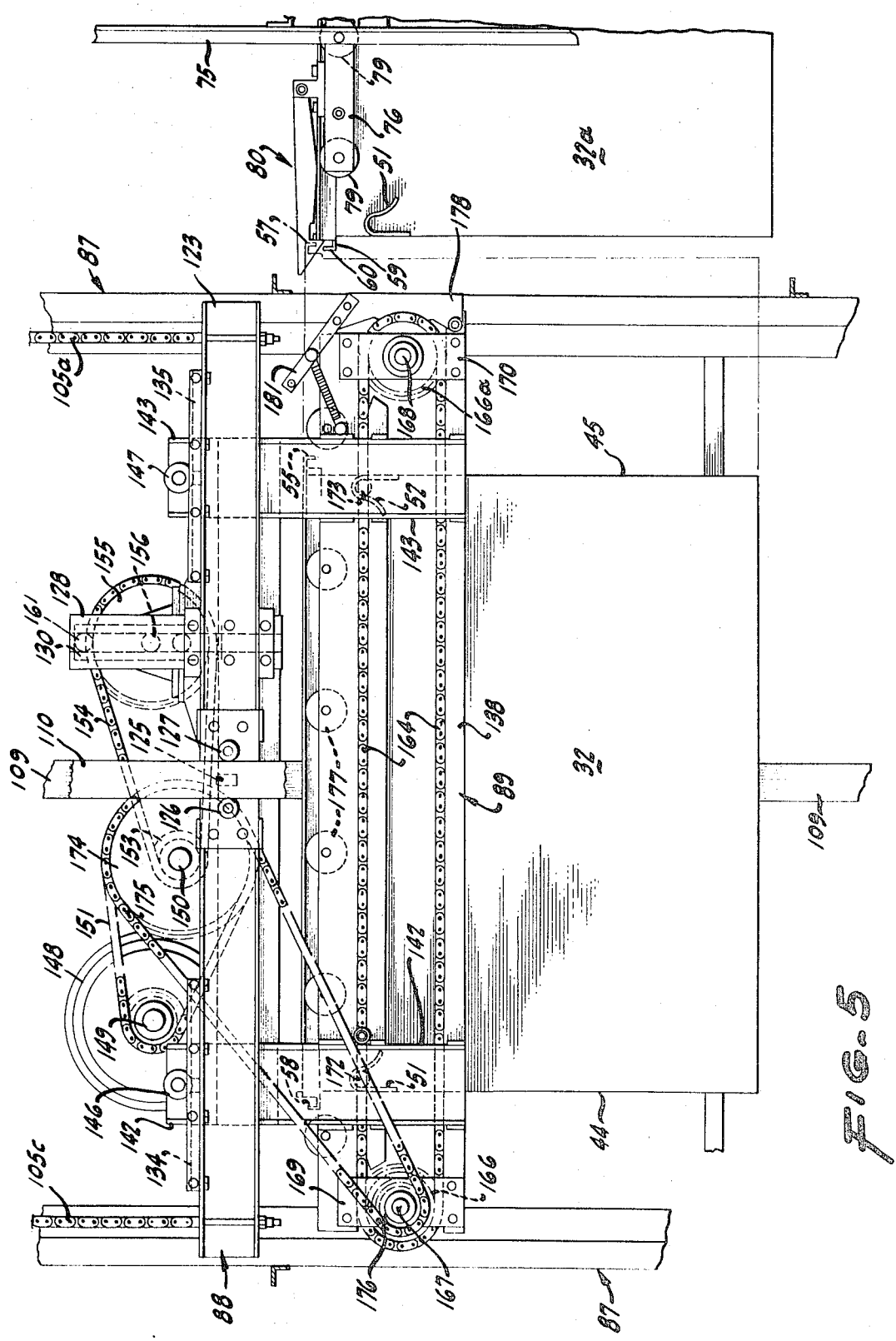
FIG. 5 is a broken side view of an inner portion of the mechanism taken along line 5–5 of FIG. 4.

A reversible motor 148 is fixedly mounted on the loader platform to provide a source of power for moving the box loader 89 horizontally with respect to the elevator cage 88, and also to provide a source of power for a pair of box conveyors carried by the platform. As seen at FIGS. 4 and 5, the drive shaft 149 of the motor 148 is coupled to an intermediate drive shaft 150 through the medium of a chain 151 which drives a sprocket 152 pinned to the shaft. The shaft 150 is rotatably mounted on the loader platform by means of appropriate bearings. A smaller sprocket wheel 153 is also pinned to the shaft 150 and, through the medium of a chain 154, drives a sprocket wheel 155 pinned to a shaft 156. The shaft 156 is also rotatably supported on the loader platform by appropriate bearings.

It is from rotation of the shaft 156 that horizontal movement is imparted to the loader platform, and this can be visualized more clearly by viewing FIG. 5. In this respect, as the shaft 156 rotates, this rotational movement is imparted to a shaft 157 through a crank assembly that includes crank arms 158 and 159. The shaft 157 is, in turn, fixedly coupled to a crank 160 which has a roller 161 secured on the free end thereof, and the roller is mounted within the vertical groove 130 of the block 128 carried by the elevator cage 88. Because the elevator cage is fixed with respect to transverse horizontal motion but the loading platform is not, rotation of the shaft 157, which tends to revolve the roller 161 about the axis of the shaft, causes the roller 161 to react against the sidewalls of the groove 130 thereby enforcing movement upon the loader platform (including the motor and all of the other parts secured thereto) in a horizontal direction with respect to the elevator cage; and, quite evidently, rolling engagement of the rollers 144—147 with the trackways 132—135 accommodates such movement of the loader platform.

Because of the difference in lengths of the crank arms 158 and 159, and further because of the respective connections thereof with the shafts 156 and 157, relative displacements must be permitted between the interconnected ends of the crank arms. Such relative movement is accommodated by structure including a roller 162 carried by the crank 158 and positioned within a groove 163 provided in the crank arm 159 and along which the roller moves as the shafts 156 and 157 rotate. The amount of horizontal movement of the loader platform is determined by the length of the crank 160. Starting from a central or neutral position wherein the crank 160 is vertically oriented, the maximum horizontal displacement of the platform occurs when the crank has been rotated 90° to a horizontal position, and is evidently equal in distance to the effective length of the crank arm (i.e., approximately the distance between the axes of the shaft 157 and roller 161). As concerns the type of motion imparted to the loading platform by the crank arm 160, the loading platform is accelerated outwardly from the neutral position thereof corresponding to the crank arm 160 being in the vertical orientation illustrated in FIG. 6 until the crank arm has traversed an angular distance of about 45°. The loading platform is then decelerated as the crank arm traverses the next succeeding angular distance of 45° until the velocity of the loading platform approaches zero which corresponds to an angular displacement of the crank arm of 90° from the neutral vertical position thereof shown. Through the following 90° displacement of the crank arm 160, the loading platform is first accelerated inwardly toward the neutral position thereof and is then decelerated towards zero velocity as the neutral position is approached, which again corresponds to a vertical position of the crank arm. Such reduction in the velocity of movement of the loading platform as it approaches either of its two outermost positions is advantageously employed in establishing conditions of engagement and disengagement, as the case may be, with a box 32 associated with the storage bank 37, pickup station 34, or discharge station adjacent the box unloaders 40. It may be noted that a crank assembly of the type illustrated in FIG. 6 and described in detail is provided in association with the shaft 156 at each of the ends thereof, and as concerns the crank assembly adjacent the channel 121 of the elevator cage 88, such crank assembly reacts against the surfaces of groove 131 in block 129 located on channel member in an identical manner to that just described.

As mentioned previously, the reason for having the loader platform horizontally movable is to permit a pair of endless conveyor chains 164 and 165 (FIGS. 2, 5, 7 and 9) carried by the platform to be projected outwardly from either the front or the rear of the tower 87 (depending on whether a box 32 is being loaded at the pickup station or at the storage bank) to facilitate engagement and disengagement with the boxes. In this regard it is to be noted that the first conveyor chain 164 (FIG. 5) is entrained about sprocket wheels 166 and 166a which are securely pinned, respectively, to stub shafts 167 and 168 rotatably supported by plates 169 and 170 by appropriate bearings. The plates 169 and 170 are rigidly fastened to the loader platform adjacent the opposite ends thereof, such as by welding or by bolts as shown, so that any horizontal transverse motion (from left to right, or vice versa, as seen at FIG. 5) imparted to the loader platform will also be imparted to the chain conveyor.

The conveyor chain 164 carries a pair of inwardly directed pins 172 and 173 which are secured to the chain for travel therewith; and, as is clear at FIG. 5, the two pins are spaced apart and the distance therebetween is equal to the distance between the two inverted receivers 51 and 52 provided along the sidewall of each box 32, so that the pins are capable of being received in the receivers. The second conveyor chain 165 is mounted along the opposite side of the loader platform in a manner identical to the mounting for the first conveyor 164; and it also carries a pair of inwardly projecting pins arranged directly across and in alignment with the pins of the first conveyor. A total of four pins are therefore provided by the conveyors 164 and 165, and the two conveyors move simultaneously and are positioned or timed with respect to each other so that when a box 32 is being moved into the tower 87, the four pins on the conveyors become engaged, respectively, in the four inverted U-shaped receivers on the sidewalls of the box.

Again referring to FIGS. 4 and 5, it may be seen that the motor 148 drives the two conveyors 164 and 165. More particularly, one end of the shaft 150 has a sprocket wheel 174 secured thereto, and this sprocket wheel, through the medium of chain 175, is coupled to a sprocket wheel 176 pinned to the stub shaft 167 for the sprocket 166 of the conveyor chain 164. This stub shaft 167 imparts motion delivered thereto from the motor 148 to the sprocket wheel 166 about which the conveyor chain 164 travels, and as a consequence thereof, the pins 172 and 173 are displaced to transport any box engaged thereby. It is to be understood that the opposite end of the shaft 150 is coupled to the conveyor chain 165 in a similar manner to drive the same from the shaft 150.

The loader platform also includes a plurality of spaced rollers 177 mounted thereon in a position slightly above the upper run of each of the conveyor chains 164 and 165. These rollers 177 are adapted to rollingly engage the undersurface of the flanges 49 and 50 on the opposed sidewalls 46 and 47 of the boxes 32 so as to support each box when it has been moved into the loader.

As another feature of the box loader 89, means are provided for releasing the latch or retainer 80 when it is desired to remove a box 32 from the storage bank 37. With reference to FIGS. 9 and 10, it is seen that an upwardly extending plate 178 is pivotally mounted adjacent its lower end for pivotal displacement about the axis of a pivot pin 178a supported by the loader frame. The inner surface 179 of the plate is curved to form a cam and it is located with respect to the conveyor chain 164 so that a cam follower 180 secured to and projecting slightly outwardly from the chain will engage this curved surface 179 and cause the plate 178 to pivot in a clockwise direction (as viewed at FIG. 9) about the pivot pin 178a. An arm 181 is secured to the top of the plate and extends angularly therefrom, and the arm 181 includes an inwardly directed pin 182 positioned so as to be capable of engaging the sloping surface 85 of the latch arm 80.

It is to be understood that when the pin 182 has been carried to the solid line position thereof in FIG. 9, the roller cam 180 has also been advanced by the conveyor chain 164 to a position where it is just ready to engage the inner curved surface 179 of the plate 178. Now, continued rotation of the conveyor chain in a counterclockwise direction causes the plate 178 and arm 181 to pivot (clockwise), and the pin 182 therefore acts upwardly against the surface 85 of the latch 80 to lift the recess 86 thereof away from engagement with the front of the box 32. A spring 183 secured at one end to the loader frame and at the other end to the arm 181 biases the arm to its normal (solid line) latching position of FIG. 9. The conveyor chain 165 is also used to actuate a latch-releasing means, identical to that just described, to release the latch 80 associated with the box on its opposite side.

From the above, it can be appreciated that various movements of the loader components including the cranks, and the conveyor chains (carrying the box-engaging pins and the cam roller) must be properly interrelated and timed so that each part or component performs its function at the proper time. Correct interrelationship is assured because these parts are properly placed and timed initially, and then the movement of each is derived from a common motor 148 and shaft 150 driven thereby. Therefore, by proper selection of the sprocket wheel sizes for driving these parts, the necessary interrelationships are established. While specific sprocket sizes, rotational velocities, dimensions, etc. are not herein set out, their proper selection will easily be accomplished by one skilled in the art; and further clarification thereof is inherent in the following description of a method of operation embodying the present apparatus.

METHOD OF OPERATION

In describing a complete cycle of operation, it may be assumed that the storage bank 37 is initially empty of any boxes 32, that the box filler 25 is operating to initially fill a succession of boxes with cartons 24 of tissue of a first color, and that these filled boxes are being advanced along the conveyor 33 to the pickup station 34. The boxes 32 containing this first color of tissue are picked up sequentially at the pickup station 34 by the box transporter mechanism 35, and transported thereby to and are deposited in an appropriate section of the storage bank 37 for this first color. Once the back stand 20 has been depleted of this first color, cartoning of a second color is begun, and boxes 32 filled with the second color are, in turn, transported by the mechanism 35 from the pickup station 34 to an appropriate section of the storage bank 37 for this particular second color. This operation continues in turn for each color until the storage bank 37 has received the desired number of colors.

It is to be understood that once the desired number of colors have been run through the back stand, the openings or compartments along the front face 77 of the storage bank will contain a plurality of horizontal rows and vertical tiers of boxes 32; and, when the bank has been filled, there will be other boxed tandemly coupled one behind some or all of the boxes 32 occupying the openings along the front face of the storage bank. The last box to be inserted in each of the rows will always occupy a position along the front face 77 of the storage bank; and, as each box is subsequently removed from the storage bank, the preceding box immediately therebehind will be advanced toward the front face and into the position previously occupied by the box being removed. The particular operations for loading the mechanism 35 with a box 32 at a pickup station 34, for unloading the box at the storage bank, and for loading a box from the storage bank into the mechanism 35 will now be described in greater detail.

LOADING AT PICKUP STATION

The motor 97 is actuated to move the box transporter mechanism 35 along rails 36 to a position alongside the pickup station 34, and the elevator cage 88 is vertically lowered to its lowermost position within the tower 87 (see FIG. 11) by the motor 98. In the solid line position of FIG. 11 the box conveyor chains 164 and 165 are so positioned that the two inwardly extending pins 172 and 173 (only the pin 173 being shown at FIG. 11) on each chain are on the bottom runs thereof. Now, suitable directional actuation of the drive shaft on the motor 148 causes the loading platform of the box loader 89 to move to the left (as viewed at FIG. 11) along the trackways 132—135. At the same time the loader platform is moving to the left, the conveyor chains 164 and 165 are also moving in the same direction along their lower runs.

At the time that the loader platform reaches its extreme limit of travel to the left, the leading pins 173 on each of the conveyor chains 164 and 165 are entering the inverted U-shaped receivers 52 and 54 on the sides of the box adjacent the rear wall 45 thereof. Continued rotation of the chains causes the pins 173 to reverse their direction of movement to carry the box to the right until the flanges 49 and 50 on opposite side of the box are brought into supported relation upon the rollers 177 of the loader platform. Movement of the chains is further continued until the trailing pins 172 enter the receivers 51 and 53 and until the box is disposed centrally within the tower. By this time, the continued movement of the crank assemblies 158, 159 and 160 has caused the entire loader platform to be returned to its initial or starting position with a box 32 being supported within the tower. During the movement just described, the shaft 156 has turned continuously through two successive 90° segments in which the loading platform has been reciprocated from an inner to an outer position (90° of shaft movement) and returned to such inner position thereof (the following 90° of shaft movement). At the same time, the two conveyor chains 164 and 165 have been moved from their initial position (with the pins 172 and 173 on the bottom runs) to a position where the pins are on the top runs of the chains and are located within the U-shaped receivers of the centrally disposed box. It will be appreciated that the stop bar 67 at the pickup station 34 must be depressed before a box 32 can be removed therefrom, and such depression of the bar is effected by the initial inward movements of the loading platform, as heretofore explained.

Now that the box has been picked up and is supported within the tower 87, the tower may be moved along rails 36 to the desired horizontal row, and the box raised, as necessary, by the elevator cage 88 to an appropriate vertical tier in the storage bank.

UNLOADING AT STORAGE BANK

FIGS. 5 and 8 illustrate the position of a box 32 which has been picked up at the pickup station 34 by the transporter 35 and transported thereby to a location at which the box will be moved into the storage bank 37. These FIGS. also illustrate another box 32a already occupying a position along the front face 77 of the storage bank, and the boxes 32 and 32a are in substantial horizontal alignment but in a vertical sense, the box 32 is slightly higher than the box 32a.

As illustrated in FIG. 5, the box 32 is supported by the box loader upon the rollers 177 which are provided on each side of the loader and engage the undersurface of the flanges 49 and 50 on opposite sides of the box. Also, the pins 172 and 173 are in the inverted U-shaped receivers 51—54 on each side of the box, there being a total of four pins and four receivers (two on each side of the box). Now the motor 148 is actuated to displace the loader platform toward the right and to move the chain conveyors 164 and 165 to the right along the upper runs thereof (all as viewed in FIGS. 5 and 8). This movement of the loading platform and conveyor chains continues until the downwardly directed leg portion 57 of the coupling member 55 on the rear wall of the box is immediately above the groove or channel defined by the upwardly directed leg portion 60 of the coupling member 58 on the front wall of box 32a. At this point, the elevator motor 98 is actuated to move the elevator 88 and box 32 carried thereby vertically downward a slight distance so that the coupling member 55 on the box 32 engages the coupling member 58 on the box 32a, as shown in broken lines in FIG. 8.

The chain conveyors 164 and 165 continue to move the box 32 to the right thereby displacing the box 32a therewith (which box 32a has now been coupled to the box 32) inwardly or rearwardly from the front face 77 of the storage bank. Evidently, the downward movement of the box 32 to effect interconnection of the coupling member 55 and 58 aligns such box vertically with the box 32a; and as the chains 164 and 165 carry the box 32 inwardly, it rides onto the rollers 79 in the storage bank and the leading pins 173 in traversing the arcuate path described by the sprockets 166a are withdrawn from the respectively associated retainers 52 and 54 on the box. The chains 164 and 165 continue to move the box 32 inwardly because of the engagement of the pins 172 with the receivers 51 and 53 until finally, a position is reached at which the pins 172 are withdrawn from such receivers. However, by this time, the box 32 will have been deposited within and completely supported on the rollers 79 on the channels 76 in the storage bank, and the latches 80 will engage the front edge of the box 32 to hold the box 32 in place at the front face 77 of the storage bank (the latches 80 simply ride over and along the flanges 49 and 50 of the box 32 as it is inserted into the storage bank because of the direction of slope of the latch surfaces 85).

After the box 32 has been thusly deposited in the storage bank, the loader platform moves to the left to return to its center or neutral position in which the crank arm 160 (FIG. 6) is vertically disposed; and, at this time, each chain conveyor 164 and 165 will have moved to a position where the pins 172 and 173 are again on the bottom run of the chains and disposed respective equal distances from the ends thereof. Now the box loader is in a position either to be returned to the pickup station 34 to pick up another box or, if desired, to remove a box from the storage bank.

LOADING A BOX FROM THE STORAGE BANK INTO THE TRANSPORTER MECHANISM

Reference may now be made to FIGS. 9 and 10 in particular in considering the operation for retrieving a box 32 from the storage bank 37 and loading such box into the transporter mechanism 35. It is first to be understood that the transporter mechanism 35 (without any box being carried thereby) is appropriately advanced to a position along the storage bank 37 in front of the box to be loaded and with the box loader 89 in appropriate alignment therewith so that the conveyor chains 164 and 165 will be capable of advancing the leading pins (the pins 72, assuming the pin orientation at the termination of the prior-described unloading cycle) into the receivers on the box.

The motor 148 is actuated in a manner such that the conveyor chains 164 and 165 are driven in an opposite direction (counterclockwise in FIG. 9) from the direction of movement when the box was being loaded into the storage bank. As the chains commence to rotate, the loader platform is also being displaced to the right (as viewed at FIG. 9).

First, each latch release pin 182 contacts the sloping surface 85 of the associated latch 80 to raise it from engagement with the box 32 as a consequence of the cam rollers 180 being advanced over the surfaces 179 of the cam plates 178. At about this same time, the pin 172 on each of the conveyors 164 and 165 is entering an appropriate inverted U-shaped receiver 51, 53 (see FIG. 10), and the loader platform has reached the farthest extent of its horizontal travel to the right. Now, continued rotation of the conveyor chains 164 and 165 while the latch is released causes the conveyor pins 172 to carry the box along with them to the left and onto the rollers 177 carried by the loader platform. Because the box 32 is latched to a preceding box immediately therebehind (not shown at FIG. 9), the latter box will be positively advanced to the front face of the storage bank 37.

As soon as this preceding box reaches the front face of the bank (the position of the box 32a in FIG. 8), the elevator cage 88, together with the box being removed, is raised slightly to permit uncoupling of the box being removed from the preceding box which now has been advanced to the front face 77 of the storage bank, and the box being removed is then further advanced into a central position in the tower 87, (solid line position of FIG. 5). Therefore, immediately after removal of such box 32 from the bank, the two boxes will be in the approximate relative positions illustrated in FIG. 5. The box 32 may now be moved to any of the unloaders 40a—40e by the box transporter mechanism 35, as desired. Clearly, discharge of a box 32 by the transporter mechanism 35 at any of the box unloaders is essentially the reverse of the pickup operation, heretofore described, that occurs at the pickup station 35 and, accordingly, requires no explicit explanation.

As indicated above, the movement of a box 32 into storage utilizes both horizontal movement, originating from the motor 148, and vertical movement, stemming from the motor 98, to cause the box to be coupled to another box already in storage. Since the time when the vertical movements take place is a function of the angular position of shaft 156, it is advantageous to mount a plurality of cams on the shaft to actuate appropriate switches 184 through 187 (FIG. 4) at the proper time to cause the required movements to be accomplished. Thus, when a box 32 is being removed from the storage bank 37, one switch 184 may be actuated to cause the motor 148 to move the elevator cage 88 upwardly a slight distance so that the coupling members 55 and 58 will clear each other; and during deposit of a box in the storage bank, switch 185 may be used to move the elevator cage downwardly to cause the coupling members to interconnect. Similarly, other appropriate motions may be initiated and controlled by the switches 186 and 187 acting at the proper time as determined by the position of shaft 156.

Also other switches 188 through 191 might be used for such purposes as for switching motor 148 from fast to slow speed just before the conveyor reaches the end of its required path of travel so that possibility of overtravel is precluded and for assuring that the conveyor belts 164 and 165 will stop in a central position, and for performing such functions as control circuit interlocking to positively prevent the operator from moving the transporter mechanism 35 horizontally when a box is being loaded or unloaded from storage. Since the circuitry for accomplishing this switching action and for generally operating, controlling and manipulating the apparatus forms no part of the present invention, it is not illustrated or described, and the switches enumerated have been shown diagrammatically with a suggestion as to functions that might be performed by each because they bear a mechanical relation to the shaft 156.

The number and location of the switches and the character of the circuitry will depend on the degree of automation which might be desired and the particular environment for the apparatus.

An embodiment of the present invention has been set forth in detail for purposes of making a complete disclosure thereof; however, numerous modifications will occur to one skilled in the art and can be made without departing from the spirit and principles of the invention.

We claim:

1. Apparatus for the transient handling and storing of articles such as facial tissue cartons in groups thereof and including: a plurality of relatively large boxes each of which is adapted to receive therein a plurality of such articles, each of said boxes including receiver means thereon; means for advancing each of said boxes to a pickup station; a storage bank provided with a box-receiving row of spaces for the storage of boxes therein one behind another, and provided also with a front face remote from said pickup station and having an opening communicating with said row through which such boxes are inserted thereinto and removed therefrom, each box upon its insertion into such row and immediately prior to its being removed therefrom being located at an insertion removal position adjacent said front face; a releasable latch member engageable with a box at said insertion removal position; a box transporter mechanism including a tower movable along a longitudinal path of travel between said pickup station and storage bank and means for moving said tower; said transporter mechanism also including a box loader cooperative with each such box for picking up the same at said pickup station and for depositing boxes one after another through such opening into said storage bank and for subsequently removing the boxes one-by-one therefrom through such opening; said transporter mechanism also including trackways for mounting said box loader on the tower for longitudinal movement therewith and for transverse movement with respect to the direction of movement of said tower, and means for transversely moving said box loader on said trackways; said box loader including a pair of endless conveyors and drive means for said conveyors, said conveyors including engaging means for engaging said receivers on said boxes when said conveyors are transversely extended to move said boxes into said tower with said conveyors; means on the box loader and movable therewith in the transverse direction for releasing said latch member; and cooperative coupling members provided by said boxes for releasably interconnecting the same so that each box discharged by said box transporter mechanism into such row of said storage bank is interconnected to any preceding box previously discharged thereinto and so that each box removed by said box transporter mechanism from such row is disconnected from any box preceding it in such row after forward displacement of such preceding box toward such insertion removal position.

2. The apparatus as set forth in claim 1 wherein said releasable latch member comprises a pivotable arm having a recess engageable with a box in such row.

3. The apparatus as set forth in claim 2 wherein the aforesaid box-receiving row inclines forwardly and downwardly toward such insertion removal position to urge boxes theretoward for engagement with said latch member.

4. The apparatus as set forth in claim 2 wherein said latch member is pivotally secured to the storage bank and automatically returnable to the latching position thereof to engage any preceding box advanced toward such insertion removal position.

5. The apparatus as set forth in claim 4 wherein the aforesaid box-receiving row inclines forwardly and downwardly toward such insertion removal position to urge boxes theretoward for engagement with said latch member.

6. The apparatus as set forth in claim 4 wherein each of said boxes includes spaced-apart sidewalls each having an outwardly directed flange extending along the upper edge thereof; and wherein said storage bank along such box-receiving row includes a pair of spaced-apart, horizontally disposed channel members each carrying a plurality of rollers adapted to be rollingly engaged by the bottom surface of the flanges on said boxes to support the boxes thereon.

7. The apparatus as set forth in claim 6 wherein said box transporter mechanism includes two spaced-apart rows of rollers adapted to be rollingly engaged by the bottom surface of the flanges on a box to support the box thereon.

8. The apparatus as set forth in claim 1 wherein each of said boxes includes spaced apart front and rear walls respectively equipped with said cooperative coupling members, the coupling member along the rear wall of any box including an element which is releasably connectable with the coupling member along the front wall of any other box.

9. The apparatus as set forth in claim 8 wherein the coupling member along one of said front and rear walls is an upwardly opening, generally U-shaped channel and the coupling member along the other of said front and rear walls is a downwardly opening, inverted generally U-shaped channel.

10. The apparatus as set forth in claim 9 wherein said box transporter mechanism includes means to displace each such box during insertion thereof into and removal thereof from said storage bank vertically relative thereto and to any preceding box generally adjacent such insertion removal position so as to effect automatic interconnection and disconnection of said coupling members during insertion and removal, respectively, of said box into and from said storage bank.

11. The apparatus as set forth in claim 9 wherein each of said boxes includes spaced-apart sidewalls respectively equipped with said receivers usable by said box transporter mechanism in handling such box; said engaging means on said conveyors being equipped with pin structures respectively receivable within said receivers in such handling of the box.

12. The apparatus as set forth in claim 11 wherein each of said receivers is an inverted, generally U-shaped structure adapted to have said pins travel upwardly into and downwardly therefrom.

13. The apparatus as set forth in claim 1 wherein each of said boxes includes spaced-apart sidewalls respectively equipped with said receivers usable by said box transporter mechanism in handling such box, each of said receivers being an inverted, generally U-shaped structure.

14. The apparatus as set forth in claim 1 and further comprising releasable stop structure located at said pickup station and engageable with any box thereat to prevent its removal therefrom and being selectively releasable from such box to permit its removal.

15. The apparatus as set forth in claim 14 wherein said box transporter mechanism includes a stop release member for releasing such stop member when the transporter mechanism is in position to remove a box from said pickup station.

16. The apparatus as set forth in claim 1 wherein said storage bank includes a plurality of said box-receiving rows of spaces arranged in vertically juxtaposed tiers each comprising a plurality of horizontally disposed rows respectively provided with insertion removal positions adjacent the front face of said storage bank; and wherein said tower further includes an elevator cage vertically movable within said tower, the aforesaid structure cooperative with each such box being carried by said elevator cage for movement therewith.

17. The apparatus as set forth in claim 16 wherein said box loader is carried by said elevator cage for movement therewith.